United States Patent
Fox et al.

(10) Patent No.: US 11,579,119 B1
(45) Date of Patent: Feb. 14, 2023

(54) RADIAL SPRINGS ON SENSOR ARMS OF PIPELINE INSPECTION TOOL

(71) Applicants: Arthur K Fox, Murray, UT (US); William Geoffrey Callahan, Cedar Hills, UT (US)

(72) Inventors: Arthur K Fox, Murray, UT (US); William Geoffrey Callahan, Cedar Hills, UT (US)

(73) Assignee: Cypress In-Line Inspection, LLC, Tulsa, OK (US)

( * ) Notice: Subject to any disclaimer, the term of this patent is extended or adjusted under 35 U.S.C. 154(b) by 6 days.

(21) Appl. No.: 17/180,072

(22) Filed: Feb. 19, 2021

Related U.S. Application Data

(63) Continuation-in-part of application No. 16/953,626, filed on Nov. 20, 2020, now abandoned.

(60) Provisional application No. 62/939,059, filed on Nov. 22, 2019.

(51) Int. Cl.
| | |
|---|---|
| *G01N 27/82* | (2006.01) |
| *G01N 27/87* | (2006.01) |
| *F16L 55/28* | (2006.01) |
| *F16L 101/30* | (2006.01) |

(52) U.S. Cl.
CPC ............. *G01N 27/87* (2013.01); *F16L 55/28* (2013.01); *F16L 2101/30* (2013.01)

(58) Field of Classification Search
CPC ....... G01N 27/87; F16L 55/28; F16L 2101/30
See application file for complete search history.

(56) References Cited

U.S. PATENT DOCUMENTS

| | | | |
|---|---|---|---|
| 4,105,972 A | 8/1978 | Smith | |
| 5,666,670 A | 9/1997 | Ryan | |
| 5,864,232 A | 1/1999 | Laursen | |
| 6,232,773 B1 * | 5/2001 | Jacobs | G01N 27/82 |
| | | | 324/242 |
| 6,340,353 B1 | 1/2002 | Pomatto | |
| 6,423,019 B1 | 7/2002 | Papay | |
| 6,538,431 B2 | 3/2003 | Couchman et al. | |
| 6,592,536 B1 | 7/2003 | Argenta | |
| 7,458,289 B2 | 12/2008 | Houldey et al. | |
| 7,548,059 B2 | 6/2009 | Thompson et al. | |
| 7,798,023 B1 * | 9/2010 | Hoyt | F16L 55/28 |
| | | | 73/865.8 |
| 7,859,256 B1 * | 12/2010 | Hoyt | G01N 27/87 |
| | | | 324/220 |

(Continued)

OTHER PUBLICATIONS

3D Printing Aids Babies Healing from Flat Head Syndrom, https://3dprint.com/84519/3d-print-helmets-flat-head/, 3D Printing, Published Jul. 27, 2015.

(Continued)

*Primary Examiner* — Dominic E Hawkins
(74) *Attorney, Agent, or Firm* — Chad Hinrichs, PLLC

(57) ABSTRACT

A set of radial springs to bias the sensor arms of an inline pipeline inspection tool radially outward towards the pipe wall. The springs are resilient clips typically made of metal which bias adjacent sensor arms away from one another and radially outward. There are two sets of springs, a forward set and a rearward set which operate independent of each other. Each set of springs operates on a plane which is perpendicular to the axis of the body of the tool and perpendicular to the planes upon which the sensor arms extend.

7 Claims, 6 Drawing Sheets

(56) References Cited

U.S. PATENT DOCUMENTS

| | | | |
|---|---|---|---|
| 8,264,219 B2 | 9/2012 | Gibson et al. | |
| 10,016,941 B1 | 7/2018 | Beard | |
| 2004/0197016 A1 | 10/2004 | Littlefield | |
| 2006/0010559 A1 | 1/2006 | Hamlet | |
| 2006/0101559 A1 | 5/2006 | Moore | |
| 2008/0042646 A1* | 2/2008 | Burkhardt | G01N 27/82 324/240 |
| 2008/0092672 A1* | 4/2008 | Gibson | F16L 55/30 73/866.5 |
| 2009/0316965 A1 | 12/2009 | Mailling | |
| 2010/0060273 A1* | 3/2010 | Couchman | G01N 27/902 324/220 |
| 2011/0132379 A1 | 6/2011 | Lee | |
| 2012/0195994 A1 | 8/2012 | El-Sibiani | |
| 2013/0289459 A1 | 10/2013 | Bernardoni | |
| 2014/0201889 A1 | 7/2014 | Pieetrzak | |
| 2014/0256209 A1 | 9/2014 | Norman | |
| 2014/0274456 A1 | 9/2014 | Cardani | |
| 2014/0371897 A1 | 12/2014 | Lin | |
| 2015/0057784 A1 | 2/2015 | Butler | |
| 2015/0210007 A1 | 7/2015 | Durand | |
| 2016/0349738 A1 | 12/2016 | Sisk | |
| 2018/0045680 A1* | 2/2018 | Thompson | G01R 33/0011 |
| 2018/0196005 A1* | 7/2018 | Fanini | G01N 29/07 |
| 2019/0360976 A1* | 11/2019 | Frueh | G01N 29/265 |

OTHER PUBLICATIONS

Osteo3d Makes a Difference with 3D Printed Helmet for 5-Month-Old craniosynostosis Patient, https://3dprint.com/97581/osteo3d-3d-printed-helmet/, Published Sep. 25, 2015.

https://3dprintingindustry.com/news/now-can-3d-print-memory-foam-34265/, Now You Can 3D Print With Memory Foam, Oct. 8, 2014.

https://govinfo.gov/content/pkg/FR-2015-05-21 /pdf/2015-11756.pdf, 49 CFR Part 571, pp. 29458-29486; DOT.

https://www.shapeways.com/blog/archives/408-3d-printing-virus-for-sti-file-type.html, Apr. 1, 2010.

Profis, Sharon,DIY:3D printing custom iPhone case,Jul. 31, 2012,retrieved on Aug. 8, 2019,; DIY3D (Year: 2012).

https://www.mcortechnolagies.com/trends-3d-scan-print-applications-blog_trashed/; Mar. 23, 2015; Retrieved Sep. 17, 2019 (Year: 2015).

Maundy, How to create your own 3D printed iPhone case, Published Apr. 5, 2012, Retrieved on Jan. 25, 2020 (Year: 2012).

\* cited by examiner

RADIAL SPRINGS ON SENSOR ARMS OF PIPELINE INSPECTION TOOL

PRIORITY CLAIM

The present application claims priority to and is a continuation-in-part application of U.S. non-provisional patent application Ser. No. 16/953,626 filed on Nov. 20, 2020 entitled Improved Magnetic Flux Leak Inline Inspection Tool which claims priority to and is a continuation-in-part of U.S. provisional patent application No. 62/939,059 filed on Nov. 22, 2019 entitled Improved Magnetic Flux Leak Inline Inspection Tool. These parent applications are incorporated herein by reference.

FIELD OF THE INVENTION

The present invention relates generally to an inline inspection tool for pipelines and other conduits. More particularly, the present invention relates to a spring and assembly which biases the sensor arms of the tool radially outward towards to the pipe wall.

BACKGROUND OF THE INVENTION

Inline inspection tools are used to locate defects in existing pipelines and other conduits. The magnetizer section of the tool typically has a plurality of sensor arms which each carry a plurality of Hall effect sensors located between a north magnet and a south magnet. The arms are extended from the tool as it passes through the pipeline. This places the arms with their sensors and magnets in close proximity to the interior pipe wall. The magnets create a magnetic field in the wall of the pipe. Defects in the pipe wall such as corrosion, pitting, cracks and the like disrupt the magnetic field as the tool passes by them. The Hall effect sensors locate these defects by sensing changes in the magnetic field.

The prior art sensor arms are biased outward by linear spring mechanisms which operate on the same plane as the one on which the sensor arm extends outward. These spring mechanisms are typically helical springs, although pressurized gas cylinders have been used on occasion. These linear spring mechanisms do not have a significant mechanical advantage over the arm. Further, due to their linear nature of expanding and contracting they are susceptible to damage from debris or rough conditions in the pipe. Once bent out of their original shape they lose much of their effectiveness.

What is needed, therefore, is a mechanism which will bias the sensor arms outward without the susceptibility of these linear spring mechanisms and which have a mechanical advantage over the sensor arm.

BRIEF SUMMARY OF THE INVENTION

The present invention uses a set of radial springs to bias the sensor arms outward towards the pipe wall. The springs are resilient clips typically made of metal which bias adjacent sensor arms away from one another and radially outward. There are two sets of springs, a forward set and a rearward set which operate independent of each other. Each set of springs operates on a plane which is perpendicular to the axis of the body of the tool and perpendicular to the planes upon which the sensor arms extend. The springs have a mechanical advantage over the sensor arms. Further, the springs are resistant to damage due to their geometry and the geometry of their application to extending the sensor arms.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
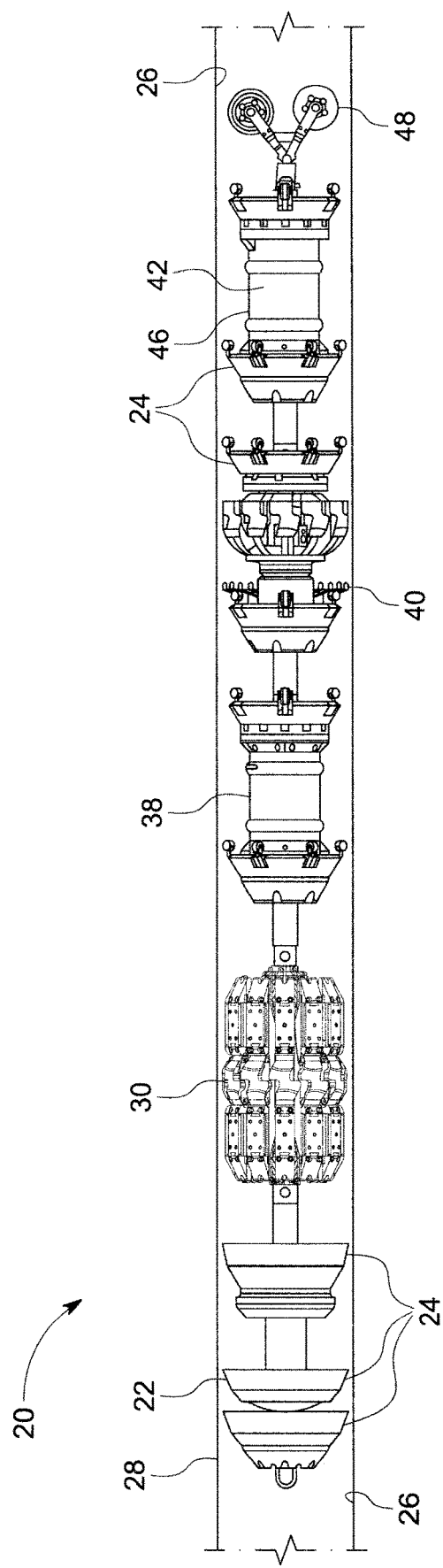
FIG. 1 is a diagram of an inline inspection tool of the present invention.
Figure 2:
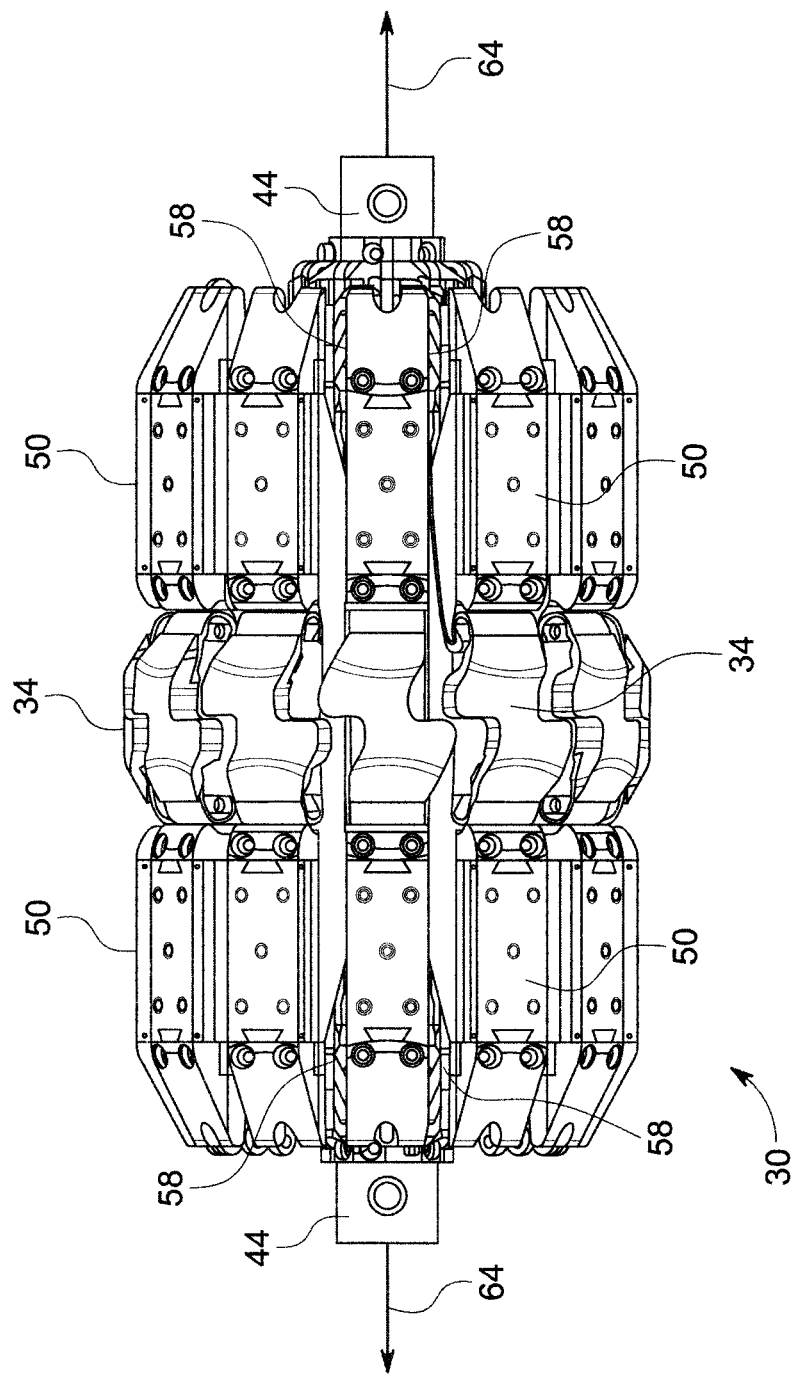
FIG. 2 is a side view of the preferred embodiment of magnetizer of the present invention.
Figure 3:
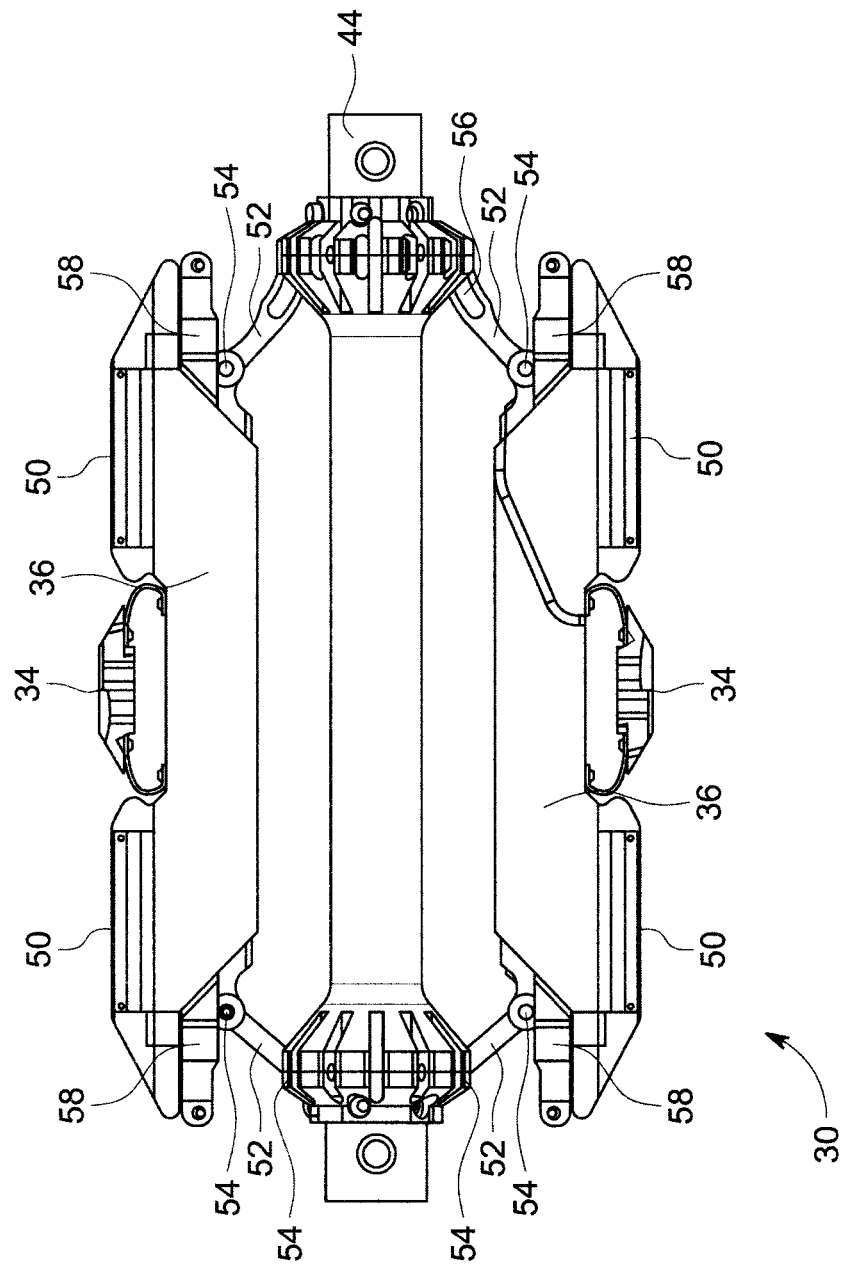
FIG. 3 is a side view of the preferred embodiment of the magnetizer of the present invention with two sensor arms, the other arms are not shown to provide a clearer explanation of the invention.
Figure 4:
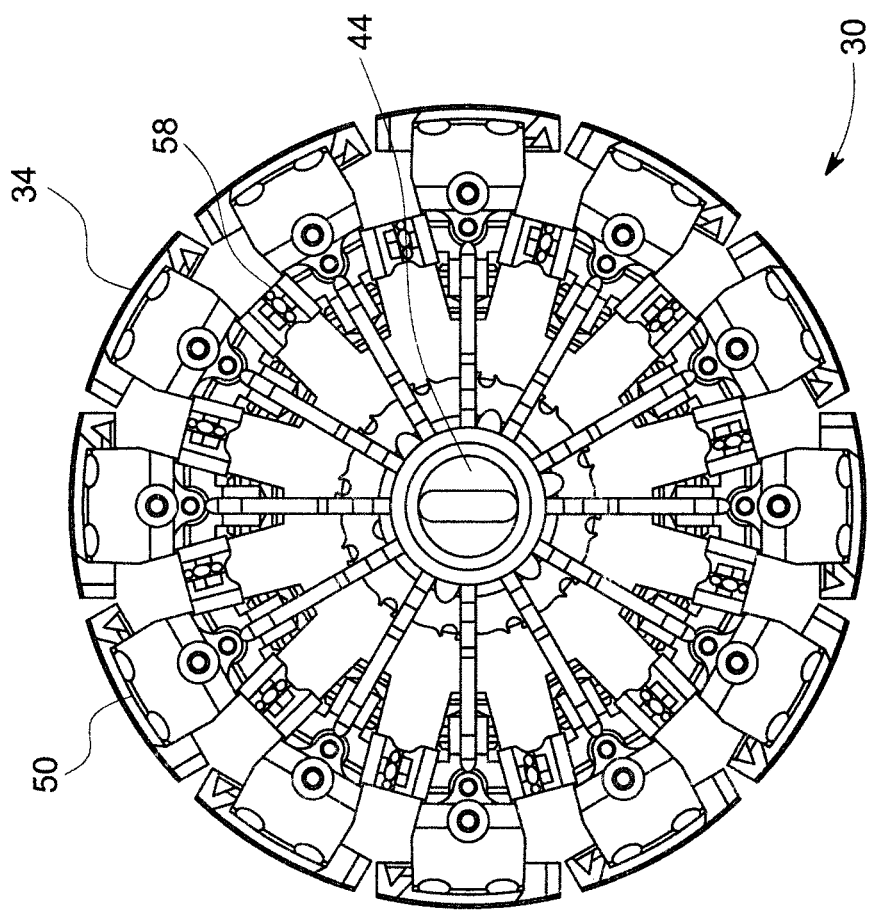
FIG. 4 is an end view of the preferred embodiment of the magnetizer of the present invention showing the circle of radial spring brackets.

In the preferred embodiment of the present invention the magnetic flux leakage (MFL) inline inspection tool 20 has several sections, as best seen in FIG. 1. The first section is the tow 22. It has a plurality urethan vanes, commonly called cups 24. The cups 24 extend radially outward from the outer circumference of the tow 22 and create a loose seal between the tow 22 and the interior wall 26 of the pipe 28. This seal allows the fluid in the pipe 28 to move the tool 20 along the pipe 28 as the fluid is conveyed through pumping or compression action. It should be noted the fluid in the pipe 28 could be a gas or a liquid. Other sections of the tool 20 may also be equipped with cups 24.

The second section of the tool 20 is the magnetizer 30 this is the section of the tool 20 which carries the magnets 32. The magnets 32 create the magnetic field in the pipe 28. The Hall effect sensors 34 measure the magnetic field in the pipe 28 and search for magnetic field leakage caused by defects such as cracks, pitting and dents in the pipe 28. The magnetizer 30, the array of Hall effect sensors 34 and the sensor arms 36 are discussed in greater detail below.

The third section of the tool 20 is the data collection and battery section 38. Data from the sensors 34 on the magnetizer 30 and the geometry sensor 40 are further processed and stored here. The batteries 42 provide power to operate the magnetizer 30 and data storage.

The fourth section of the tool 20 is the geometry sensor 40. It has a plurality of arms which extend from the body 44 of the tool 20 and determine the interior diameter of the pipe 28. This is used to locate dents in the pipe 28 and sections which are out of round.

The fifth section of the tool 20 is the inertial mapping unit or IMU 46. It has micro processing capability and batteries which provide power for the operation of the tool 20. The primary purpose of the IMU 46 is to calculate data and correlate the location of the tool 20 in the pipeline 28 with the location of defects.

The sixth section of the tool 20 is the odometer 48. It measures the distance the tool 20 has traveled and provides related data to the IMU 46.

It should be noted the order of the sections of the tool 20 are mentioned above for ease of description and explanation. The exact order of the sections may vary. Further it may be possible to have a tool 20 without one of the fore mention sections and still fall within the scope of protection of this patent.

The magnetizers 30 of an MFL inline pipeline inspection tools 20 typically have a plurality of Hall-effect sensors 34 and magnets 50 which are located around the body of the tool 20. In the preferred embodiment of the present invention the sensors 34 and magnets 50 ride on a plurality of sensor arms 36 which extend radially outward from the tool 20. See FIGS. 2, 3, 4 and 6. This is to ensure the arms 36 and their sensors 34 and magnets 50 are adjacent to the wall of the pipe 28 being inspected. Each arm 36 has a north magnet 50 and a south magnet 50 with the sensors 34 located between the magnets 50. The magnets 50 may be covered by a wear plate 66. Likewise, the sensors 34 may be embedded in a block of resin to protect them from abrasion as the tool 20 passes through a pipe 28.

Each arm 36 is secured to the body 44 of the tool by a pair of links 52 which form a 4 bar linkage with the arm 36 and body 44. The 4 bar linkage has three pivot points 54 and a sliding pivot point 56. The sliding pivot point 56 allows pivot point to move along the linking arm 52. The use of the sliding pivot point 56 allows the arm 36 to move radially outward from the body 44 while maintaining the arm 36 parallel to the body 44 and pipe wall 26.

Figure 5:
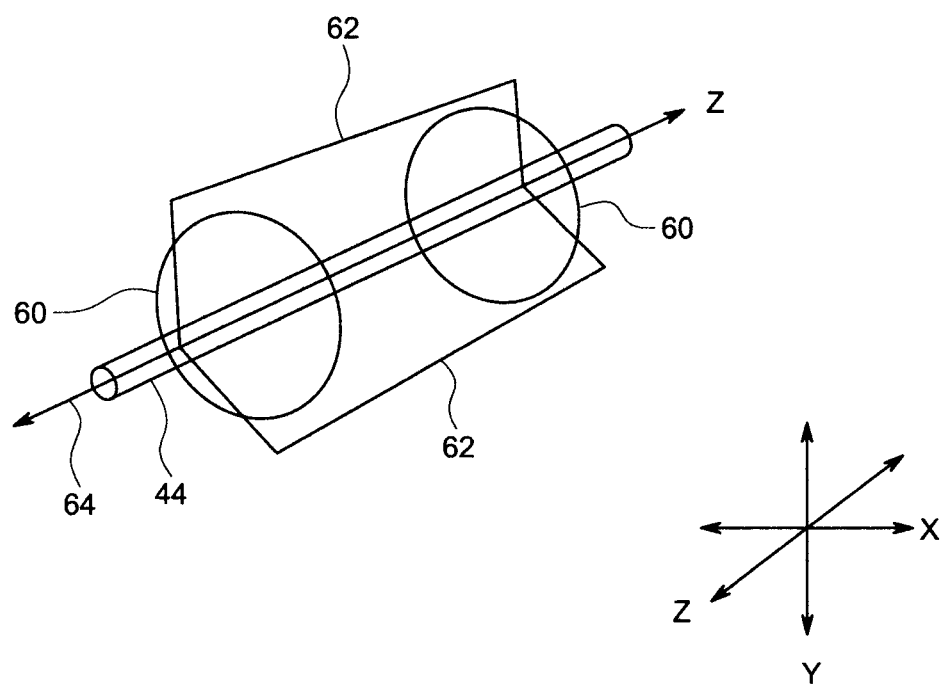
FIG. 5 is a diagram illustrating the relationship between the axis of the body of the tool, the planes of the springs and the planes of operation of the sensor arms.

The preferred embodiment of the present invention uses a pair of spring clips 58 on each arm 36. One spring clip 58 is located on each end of the sensor arm 36. These spring clips 58 push adjacent sensor arms 36 away from one another. Thus, there is a circle of springs 58 on each end of the sensor arms 36 that bias the sensor arms 36 outward away from the body 44 of the tool 20 and toward the interior wall 26 of the pipe 28 being inspected. The springs 58 operate on two planes 60 which are perpendicular to the various planes 62 upon which each of the sensor arms 36 extend from the body 44 of the tool 20. See FIG. 5. The two planes 60 of operation of the springs 58 are perpendicular to the axis 64 of the body 44 of the tool 20. The planes 62 of operation of the sensor arms 36 extend parallel with and radially outward from the axis 64 of the body 44 of the tool 20. The planes 60 of the springs 58 are perpendicular with the planes 62 of the sensor arms 36. Note for explanation purposes FIG. 5 shows only two planes 62 of the sensor arms 36. In practice the body 44 of the tool 20 is encircled by sensor arms 36. So, there would be numerous other planes 62 of the sensor arms 36 on the tool 20.

Figure 6:
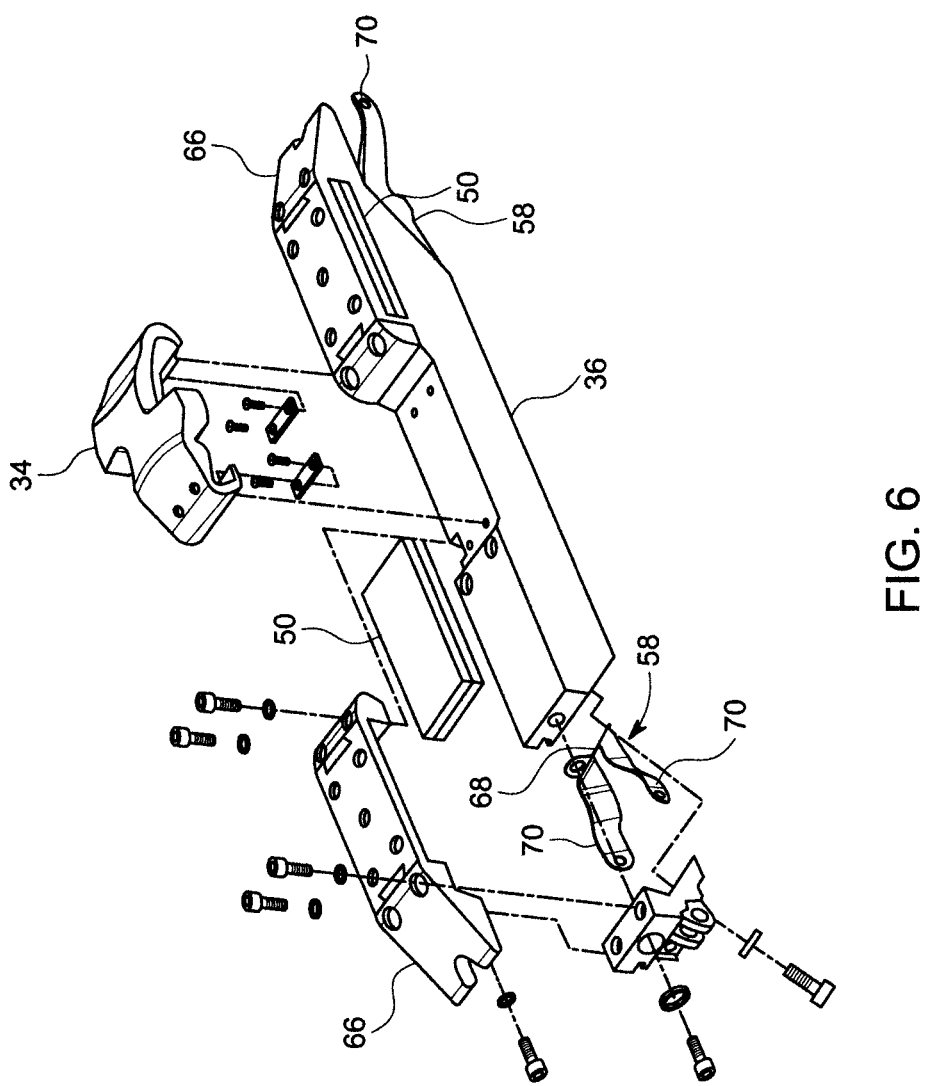
FIG. 6 is a n exploded view of the preferred embodiment of the present invention.

In the preferred embodiment the springs 58 are metal clips which have been cut and bent to the geometry shown in the FIG. 6. The metal clip springs 58 are strong and resilient to resist being bent out of shape or pulled out of alignment like the prior art linear helical springs. The prior art springs can be easily pulled out of alignment, bent or otherwise damaged by debris in the line. Further, because the metal clip springs 58 on the front end or leading end of the sensor arms 36 are separate from the metal clip springs 58 on the back end or trailing end of the sensor arms 36, forces on one set of springs 58 do not impact the operation of the other set of springs 58.

In the preferred embodiment, each spring 58 has a base 68 and two arms 70. The base 68 is fastened to one end of the sensor arm 36. When the base 68 is fastened to the sensor arm 36 the spring arms 70 extend outward from opposing sides of the sensor arm 36. The ends of the spring arms 70 are fastened to the ends of the spring arms 70 on the adjacent sensor arms 36. It should be appreciated the exact geometry of the springs 58 could vary so long as they provide a force pushing adjacent sensor arms 36 away from one another and in turn radially outward from the body 44. Likewise, it is possible to practice the present invention by providing a set of springs 58 on a plane 60 at the front end of the sensor arm 36 and a set of springs 58 on a plane 60 at the rear of the sensor arms 36, wherein there are two springs 58 (front and rear) between each adjacent sensor arm 36 and the springs 58 push against the adjacent sensor arms 36.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A pipeline inline inspection tool comprising:
   a body having a central axis, a plurality of sensor arms and a plurality of springs,
   a Hall effect sensor located on each sensor arm between a north magnet and a south magnet,
   wherein each sensor arm extends radially outward from the body on its own plane which is parallel with the central axis of the body, and there is a spring located on each of the sensor arms, the springs pushing against a spring on adjacent sensor arms and biasing the sensor arms radially outward.

2. The pipeline inline inspection tool of claim 1, each sensor arm further comprising:
   a pair of links which form a 4-bar linkage with the sensor arm and body,
   the 4-bar linkage having three pivot points and a sliding pivot point,
   wherein the sliding pivot point allows the pivot point to move along one of the links, and
   wherein the 4-bar linkage allows the senor arm to move radially outward from the body while maintaining the arm parallel to the body.

3. The springs of claim 1 further comprising:
   a clip constructed of bent metal.

4. The pipeline inspection tool of claim 1 further comprising:
   a forward spring and a reward spring located on each sensor arm,
   wherein the forward and reward springs operate independent of one another.

5. The pipeline inspection tool of claim 3, each spring comprising:
   a base and two arms, each arm having and end,
   the base being fastened to one end of the sensor arm, the spring arms each extending outward from sensor arm and engaging with the end of an arm of a spring mounted on an adjacent sensor arm.

6. The pipeline inspection tool of claim 4 further comprising:
   the forward springs being located on a plane perpendicular to the planes upon which the sensor arms extend and perpendicular to the central axis of the body.

7. The pipeline inspection tool of claim 5 further comprising:

the reward springs being located on a plane perpendicular to the planes upon which the sensor arms extend and perpendicular to the central axis of the body.

* * * * *